United States Patent
Reed et al.

(10) Patent No.: US 9,667,048 B2
(45) Date of Patent: May 30, 2017

(54) CATHODIC PROTECTION SYSTEM FOR MULTIPLE STRUCTURES USING SHUNT MODULES

(71) Applicants: Bryan Reed, Camp Verde, AZ (US); Justin Duhamell, Suprise, AZ (US)

(72) Inventors: Bryan Reed, Camp Verde, AZ (US); Justin Duhamell, Suprise, AZ (US)

(73) Assignee: Accurate Corrosion Control, Inc., Glendale, AZ (US)

( * ) Notice: Subject to any disclaimer, the term of this patent is extended or adjusted under 35 U.S.C. 154(b) by 544 days.

(21) Appl. No.: 14/205,071

(22) Filed: Mar. 11, 2014

(65) Prior Publication Data

US 2014/0251680 A1    Sep. 11, 2014

Related U.S. Application Data

(60) Provisional application No. 61/776,402, filed on Mar. 11, 2013.

(51) Int. Cl.
  *H05K 7/02*    (2006.01)
  *H02G 3/16*    (2006.01)
  *C23F 13/22*   (2006.01)

(52) U.S. Cl.
  CPC .............. *H02G 3/16* (2013.01); *C23F 13/22* (2013.01)

(58) Field of Classification Search
  CPC   H02G 3/16; C23F 13/22; C23F 13/20; H01R 4/56
  See application file for complete search history.

(56) References Cited

U.S. PATENT DOCUMENTS

| | | | | |
|---|---|---|---|---|
| 3,245,021 A * | 4/1966 | Kernander | ........... | B23K 1/0018 174/15.6 |
| 3,491,268 A * | 1/1970 | Koenig | .................. | H02B 1/056 361/650 |
| 4,541,032 A * | 9/1985 | Schwab | ............... | H01H 1/5805 361/600 |
| 5,726,852 A * | 3/1998 | Trifiletti | ................. | H02B 1/056 361/115 |
| 7,580,247 B1 * | 8/2009 | Pearson | ................. | H02B 1/056 174/149 B |
| 2002/0196593 A1 * | 12/2002 | Kizis | ........................ | H01C 7/12 361/91.1 |
| 2005/0250389 A1 * | 11/2005 | Johansen | ............. | H01R 9/2641 439/709 |

* cited by examiner

*Primary Examiner* — Steven T Sawyer
(74) *Attorney, Agent, or Firm* — Robert A. Parsons; Michael W. Goltry; Parsons & Goltry

(57) ABSTRACT

A shunt module for use in an impressed current cathodic protection system includes a rail mounting mechanism, an electrically insulating strip carrier mounted to the rail mounting mechanism, and a shunt. The shunt includes a conductive strip or wire having contacts at opposing ends. The shunt is coupled to the strip carrier and electrically isolated from the mounting mechanism.

4 Claims, 2 Drawing Sheets

CATHODIC PROTECTION SYSTEM FOR MULTIPLE STRUCTURES USING SHUNT MODULES

CROSS-REFERENCE TO RELATED APPLICATION

This application claims the benefit of U.S. Provisional Patent Application No. 61/776,402, filed Mar. 11, 2013.

FIELD OF THE INVENTION

This invention relates to impressed current cathodic protection systems.

More particularly, the present invention relates to shunts in cathodic protection systems for protecting multiple structures.

BACKGROUND OF THE INVENTION

In the field of cathodic protection, corrosion of metallic structures is controlled by converting the metallic structure to be protected into a cathode of an electrochemical cell. There are passive and active systems. In a passive system, a more easily corroded sacrificial metal is employed as the anode (galvanic anode). In order for galvanic cathodic protection to work, the anode must possess a lower (that is, more negative) electrochemical potential than that of the cathode (the target structure to be protected). In this manner, the sacrificial metal of the anode corrodes instead of the protected metal. The passive system is employed on smaller structures, while larger structures, such as pipelines, require an active system. For larger structures, or where electrolyte resistivity is high, galvanic anodes cannot economically deliver enough current to provide protection. In these cases, impressed current cathodic protection (ICCP) systems are used. These consist of anodes connected to a DC power source, often a transformer-rectifier connected to AC power. Current flows between the anode and cathode, slowly corroding the anode and leaving the cathode un-corroded. Shunts are calibrated resistors used to measure current flow. These are hardwired into an impressed current cathodic protection system. While shunts are effective, they are difficult and time consuming to install. Often, additional structures are added and need to be protected. Expanding an impressed current cathodic protection system is made more difficult by the necessity of wiring in additional shunts.

It would be highly advantageous, therefore, to remedy the foregoing and other deficiencies inherent in the prior art.

An object of the present invention is to provide a shunt module for use in impressed current cathodic protection systems.

SUMMARY OF THE INVENTION

Briefly, to achieve the desired objects and advantages of the instant invention provided is a shunt module for use in an impressed current cathodic protection system. The shunt module includes a rail mounting mechanism, an electrically insulating strip carrier mounted to the rail mounting mechanism, and a shunt. The shunt includes a conductive strip or wire having contacts at opposing ends. The shunt is coupled to the strip carrier and electrically isolated from the mounting mechanism.

In a further aspect, the shunt module is carried in a bond box for providing shunt connections in an impressed current cathodic protection system. The bond box includes a body defining an interior volume. At least two spaced apart vertical channels are mounted to the body within the interior volume. At least one horizontal rail is adjustably coupled between the vertical channels. Multiple shunt modules can be removably coupled to the at least one rail.

The bond box includes a cable coupled to a terminal of a rectifier extending into the interior volume of the bond box and coupled to a contact of one of the shunt modules. Additional cables extend from the interior volume of the bond box and each are coupled between one of a structure to be protected and an anode, and the other terminal of each of the shunt modules.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE PREFERRED EMBODIMENTS

Figure 1:
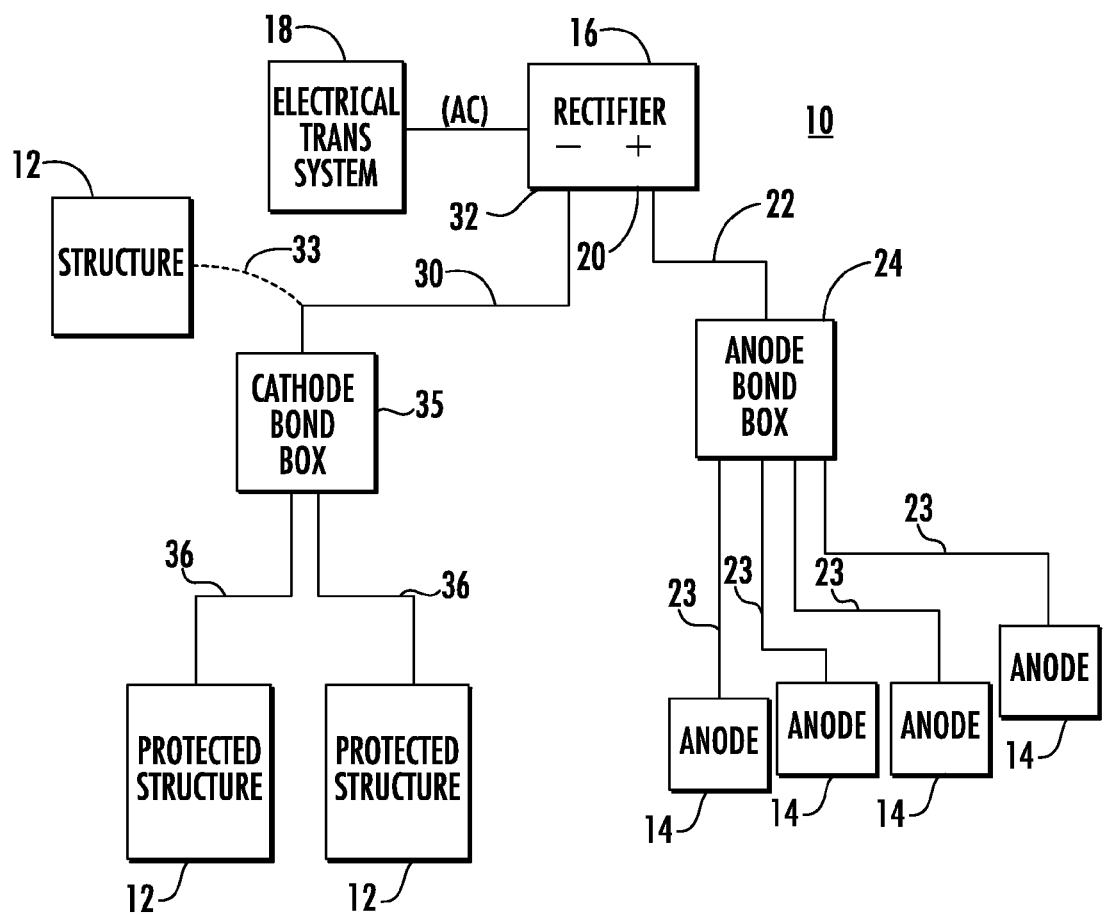
FIG. 1 is a simplified schematic of an impressed current cathodic protection system for multiple structures.

Turning now to the drawings in which like reference characters indicate corresponding elements throughout the several views, attention is directed to FIG. 1 which illustrates in general, an impressed current cathodic protection system, generally designated 10, for use in protecting multiple structures 12. Multiple structures 12 protected by system 10 are typically pipelines, but can include any structure needing cathodic protection such as metallic storage tanks and the like. Impressed current cathodic protection system 10 essentially forms an electrolytic cell, where the structures 12 are made to be the cathode of the cell, and anodes 14 are installed in the ground bed spaced from structures 12. Current is made to flow from anodes 14 to structures 12 by converting alternating current power to direct current and impressing the direct current into the ground bed carrying the structures 12 through anodes 14.

Impressing the direct current into the ground bed is typically accomplished by providing a rectifier 16 which receives high-voltage single phase or three-phase alternating current (AC) from an electrical transmission system 18. The rectifier reduces the voltage and converts the alternating current to direct current (DC). Rectifier 16 typically consists of two basic devices, a transformer to convert AC power from electrical transmission system 18 to the much lower DC voltage needed for cathodic protection, and a rectifying device to convert the low voltage AC to DC. The direct current is supplied from a positive terminal 20 of rectifier 16 by a cable 22 to an anode bond box (junction box) 24. Anodes 14 are all connected together in parallel by cables 23, with cable 22 coupled to positive terminal 20 of rectifier 16. Typically, anodes 14 are coupled in parallel by using shunts carried by anode bond box 24. In this manner, current flow can be measured.

When a single structure is protected, a cable 30 is connected to negative terminal 32 of rectifier 16 and attached to the buried structure 12 (dotted line 33), to complete the return circuit. When multiple structures 12 are to be protected, a cathode bond box 35 is employed. Typically, structures 12 are coupled in parallel by cables 36 coupled between each structure 12 and a shunt carried by cathode bond box 35. In this manner, current flow can be measured. In this instance, cable 30 is coupled to negative terminal 32 of rectifier 16 and coupled to the buried structures 12 through cathode bond box 35 to complete the return circuit.

Figure 2:
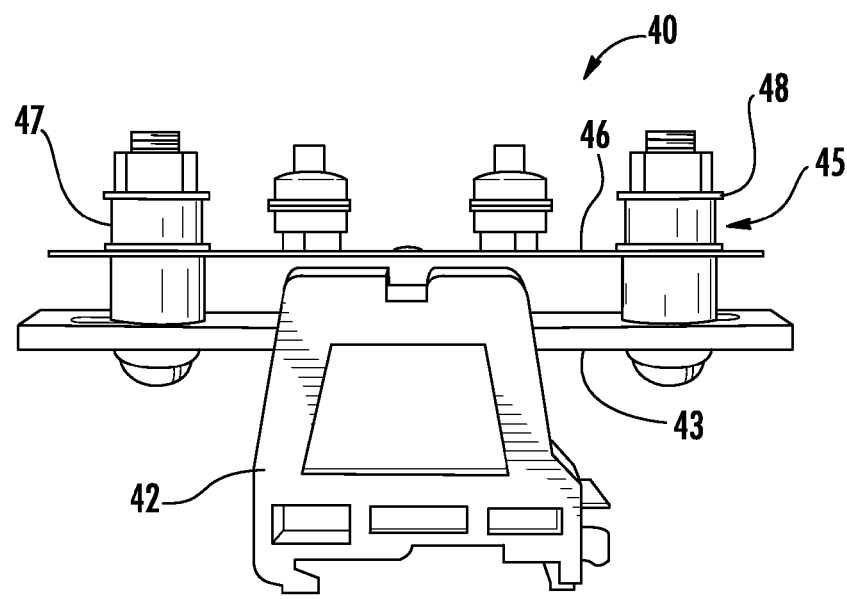
FIG. 2 is a side view of a shunt module according to the present invention.

Referring now to FIG. 2, a shunt module 40 is illustrated. Shunt module 40 includes a rail mounting mechanism 42, supporting an electrically insulating strip carrier 43 having opposing ends 44 and 49, and a shunt 45 (current shunt resistor). Shunt 45 is coupled to strip carrier 43 and is therefore electrically isolated from mounting mechanism 42. Shunt 45 is of a type well known in the art and includes a conductive strip or wire 46 having contacts at opposing ends 47 and 48. Conductive strip or wire 46 is coupled proximate opposing ends 47 and 48 to strip carrier 43 proximate opposing ends 44 and 49, respectively. Thus, in this embodiment, conductive strip or wire 46 of shunt 45 is carried overlying and spaced apart from strip carrier 43 and rail mounting mechanism 42. The resistance of conductive strip or wire 46 is known, and can be used to determine current flow. Current flowing through shunt 45 can be measured by the application of Ohm's law. It will be understood that various resistance shunts 45 can be employed as determined to be necessary for the intended use.

Figure 3:
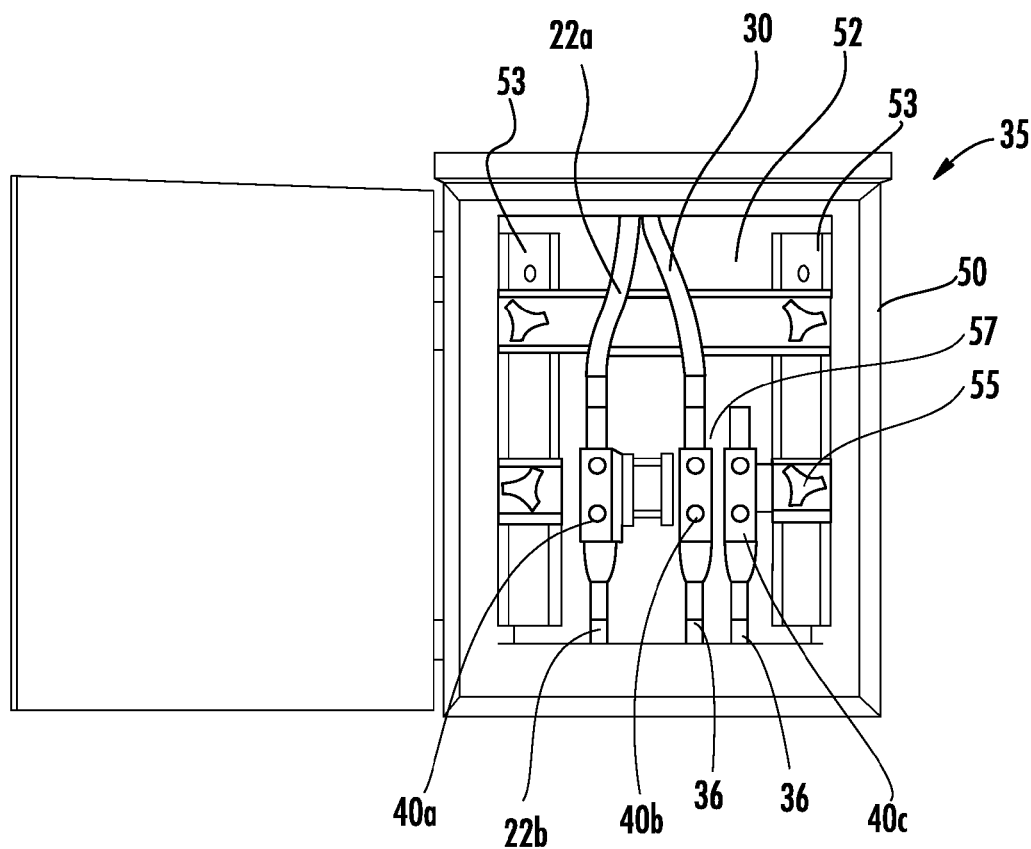
FIG. 3 is a plan view of a bond box, according to the present invention, and used in the impressed current cathodic protection system.

Turning now to FIG. 3, bond box 35 is illustrated in more detail. Bond box 35 includes a body 50 defining an interior volume 52. Vertical channels 53 are mounted to body 50 within interior volume 52. One or more horizontal rails 55 are adjustably coupled to channels 53 to allow vertical adjustments in positioning. Shunt modules 40 are removably couplable to rails 55. Rail mounting mechanism 42 are attachment elements and rails 55 are complimental attachment elements which receive mounting mechanism 42. Each rail 55 can support a plurality of shunt modules 40 which can be easily installed and removed. In the preferred embodiment, rails 55 and mounting mechanism 42 are DIN rails and mounts, well known in the electrical arts.

Still referring to FIG. 3, three shunt modules 40*a*, 40*b* and 40*c* are illustrated mounted on rail 55. It will be understood that more or less shunt modules can be employed to accommodate the number of structures 12 to be protected. In the present example, two structures 12 are being protected. Shunt modules 40*b* and 40*c* are coupled in parallel by a bus bar 57 coupled between lugs at one end 47 of each shunt 40. Cable 30, coupled to negative terminal 32 of rectifier 16 enters interior volume 52 and is coupled to bus bar 57, typically at a lug in one of shunt modules 40*b* and 40*c* at end 47. Cables 36 extend from a lug on each of shunt modules 40*b* and 40*c* at end 48. Additional shunt modules 40 can be easily inserted into interior volume 52 simply by clipping the module to horizontal rail 55, coupling bus bar 57 to end 47 of shunt 45 carried thereby, and coupling the opposing end 48 via a cable 36 to an additional structure 12.

Shunt module 40*a*, in this embodiment, illustrates an alternative circuit to anode bond box 24. In this example, cable 22 is coupled to anode bond box 24 through cathode bond box 35. Cable 22 includes a portion 22*a* which extends from positive terminal 20 of rectifier 16 into interior volume 52 of body 50 and is coupled to a lug at end 47 of shunt 45 on shunt module 40*a*. A portion 22*b* of cable 22 extends from a lug at end 48 of shunt 45 on shunt module 40*a* out of interior volume 52 to anode box 24. It will be understood that other variations can be employed in the overall circuit provided.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A bond box for providing shunt connections in an impressed current cathodic protection system, comprising:
    a body defining an interior volume;
    at least two spaced apart vertical channels mounted to the body within the interior volume;
    at least one horizontal rail adjustably coupled between the vertical channels;
    a shunt module coupled to the at least one rail, the shunt module comprising:
        a rail mounting mechanism coupled to the at least one horizontal rail;
        an electrically insulating strip carrier mounted to the rail mounting mechanism; and
        a shunt including a conductive strip or wire having a first contact proximate a first end and a second contact proximate an opposing second end, the shunt coupled to the strip carrier and electrically isolated from the mounting mechanism;
    a second shunt module coupled to the at least one rail, the second shunt module comprising:
        a rail mounting mechanism coupled to the at least one horizontal rail;
        an electrically insulating strip carrier mounted to the rail mounting mechanism;
        a shunt including a conductive strip or wire having a first contact proximate a first end and a second contact proximate an opposing second end, the shunt coupled to the strip carrier and electrically isolated from the mounting mechanism; and
        a bus bar coupled between the first contact of the shunt module and the first contact of the second shunt module;
    a first cable coupled to a terminal of a rectifier enters the interior volume and is coupled to the first contact of the shunt module; and
    additional cables are coupled between one of a structure to be protected and an anode, and the second terminal of the shunt module and the second terminal of the second shunt module.

2. A bond box for providing shunt connections in an impressed current cathodic protection system as claimed in claim 1 wherein the conductive strip or wire of the shunt has a known resistance.

3. A bond box for providing shunt connections in an impressed current cathodic protection system as claimed in claim 2 wherein the rail mounting mechanism is a DIN mount and the horizontal rails are DIN rails.

4. A bond box for providing shunt connections in an impressed current cathodic protection system, comprising:
    a body defining an interior volume;
    at least two spaced apart vertical channels mounted to the body within the interior volume;
    at least one horizontal rail adjustably coupled between the vertical channels;
    a first shunt module coupled to the at least one rail, the first shunt module comprising:

a rail mounting mechanism coupled to the at least one horizontal rail;
an electrically insulating strip carrier mounted to the rail mounting mechanism; and
a shunt including a conductive strip or wire having a first contact proximate a first end and a second contact proximate an opposing second end, the shunt coupled to the strip carrier and electrically isolated from the mounting mechanism; and a second shunt module coupled to the at least one rail, the second shunt module comprising:
a rail mounting mechanism coupled to the at least one horizontal rail;
an electrically insulating strip carrier mounted to the rail mounting mechanism; and
a shunt including a conductive strip or wire having a first contact proximate a first end and a second contact proximate an opposing second end, the shunt coupled to the strip carrier and electrically isolated from the mounting mechanism;

a bus bar coupled between the first contact of the first shunt module and the first contact of the second shunt module;

a first cable coupled to a terminal of a rectifier extending into the interior volume and coupled to the first contact of the first shunt module; and additional cables extending from the interior volume and each coupled between one of a structure to be protected and an anode, and the second terminal of the first shunt module and the second terminal of the second shunt module.

* * * * *